(12) United States Patent
Mah et al.

(10) Patent No.: US 8,546,017 B2
(45) Date of Patent: Oct. 1, 2013

(54) COMPOSITE FOR ANODE MATERIAL, ANODE MATERIALS AND LITHIUM BATTERY USING THE SAME

(75) Inventors: Sang-kook Mah, Seoul (KR); Han-su Kim, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 783 days.

(21) Appl. No.: 12/130,145

(22) Filed: May 30, 2008

(65) Prior Publication Data
US 2009/0169994 A1    Jul. 2, 2009

(30) Foreign Application Priority Data
Dec. 28, 2007  (KR) .................. 10-2007-0140670

(51) Int. Cl.
| H01M 4/38 | (2006.01) |
| H01M 4/48 | (2010.01) |
| H01M 4/13 | (2010.01) |
| H01M 4/58 | (2010.01) |
| H01M 4/60 | (2006.01) |
| H01M 4/80 | (2006.01) |

(52) U.S. Cl.
USPC ............ 429/218.1; 429/213; 429/231.8; 429/235; 429/236; 429/245; 252/182.1; 252/502; 427/215

(58) Field of Classification Search
USPC ............ 429/213, 218.1, 231.8, 235, 236, 429/245; 427/215; 252/182.1, 502
See application file for complete search history.

(56) References Cited

U.S. PATENT DOCUMENTS

| 2005/0214644 A1* | 9/2005 | Aramata et al. ........... 429/218.1 |
| 2006/0068287 A1* | 3/2006 | Morita et al. ............... 429/223 |
| 2006/0166098 A1* | 7/2006 | Tabuchi et al. ............. 429/232 |

FOREIGN PATENT DOCUMENTS

| JP | 6-318454 | 11/1994 |
| JP | 2000-243396 | 9/2000 |
| KR | 2005-7311 | 1/2005 |

OTHER PUBLICATIONS

Yang, J. et al. "$SiO_x$-based anodes for secondary lithium batteries", *Solid State Ionics*, vol. 152-153 (2002), p. 125-129.

* cited by examiner

*Primary Examiner* — Patrick Ryan
*Assistant Examiner* — Ladan Mohaddes
(74) *Attorney, Agent, or Firm* — Christie, Parker & Hale, LLP

(57) ABSTRACT

Provided is a composite for anode material, a method of manufacturing the composite for anode material, and a cathode and a lithium battery that includes the composite for anode material, and more particularly, to a composite for anode material that has a large charge and discharge capacity and a high capacity retention, a method of manufacturing the composite for anode material, and a cathode and a lithium battery that includes the composite for anode material. Also, the composite for anode material in which Si or Si and carbon are distributed in silicon oxide particles is provided.

12 Claims, 6 Drawing Sheets

| ELEMENT | WEIGHT% | ATOM% |
|---|---|---|
| Area 1 | | |
| O (K) | 18.4 | 28.3 |
| Si(K) | 81.6 | 71.7 |
| Area 2 | | |
| O (K) | 44.5 | 58.5 |
| Si(K) | 55.5 | 41.5 |

COMPOSITE FOR ANODE MATERIAL, ANODE MATERIALS AND LITHIUM BATTERY USING THE SAME

CROSS-REFERENCE TO RELATED PATENT APPLICATION

This application claims the benefit of Korean Patent Application No. 10-2007-0140670, filed on Dec. 28, 2007, in the Korean Intellectual Property Office, the disclosure of which is incorporated herein in its entirety by reference.

BACKGROUND OF THE INVENTION

1. Field of the Invention

The present invention relates to a composite for an anode material, and anode materials and a lithium battery using the composite for an anode material, and more specifically, to a composite for an anode material having a large charge and discharge capacity and good capacity retention, and an anode material and a lithium battery having the composite for an anode material.

2. Description of the Related Art

Lithium has been used as an anode material for conventional lithium batteries. However, if lithium is used as the anode material, a short circuit of a battery occurs due to the formation of dendrite, and thus, there is a high possibility of explosion. Accordingly, a carbon group material has been used as the anode material instead of lithium.

The carbon group anode material includes crystalline carbon such as graphite and artificial graphite and amorphous carbon such as soft carbon and hard carbon. Amorphous carbons have a large capacity. However, they have a high irreversibility during charge and discharge process. Graphite is a representative crystalline carbon, and is used as an anode material due to its high capacity, that is, graphite has a theoretical capacity limit of 372 mAh/g. However, although such graphite and carbon group materials have a high theoretical capacity limit, the theoretical capacity limit remains only around 380 mAh/g. Thus, such graphite and carbon group materials can hardly be used as a anode in high capacity lithium batteries.

In order to overcome the above problem, presently, anode materials belonging to a metal group or an inter-metallic compound group have been actively studied. For example, lithium batteries that use metals such as Al, Ge, Si, Sn, Zn, or Pb or a semi-metal as an anode material have been studied. These materials have high capacity and high energy density, and can occlude and emit an amount of lithium ions larger than an anode material that uses a carbon group material, and thus, it is believed that a battery having a high capacity and a high energy density can be manufactured using the above mentioned materials. For example, it is known that pure silicon has a theoretical capacity of as high as 4017 mAh/g.

However, these materials have a reduced cycle life compared to the carbon group materials, and thus, it is yet difficult to put them to practical use. If inorganic particles of Si or Sn are used as the anode material, that is, a material to insert or extract lithium, the electrical conductivity between the active materials is reduced or an anode material is exfoliated from a current collector due to change in volume during charging and discharging processes. That is, the inorganic particles such as Si or Sn included in the anode material expand their volume by 300 to 400% by inserting lithium during charging. When lithium is extracted from the inorganic particles by discharging, the volume of the inorganic particles is contracted. In this way, when the charge and discharge cycles are repeated, cavities are formed between the inorganic particles and the anode material, and thus, an electrical insulation can be generated, which results in a rapid reduction in cycle life of the anode material. For this reason, the practical use of these materials is still hindered in a lithium battery.

In order to overcome the problems described above, an anode material that a mixture of flakes of metal or alloy powder, flakes of carbon powder, and binder, capable of reversibly storing/discharging lithium has been disclosed in Japanese Patent Publication No. 1994-318454. However, since the anode material is merely a composite anode material that has simply been mixed, stresses occur due to expansion and contraction of a metal according to the repetition of charge and discharge processes, and there is a severe disconnection of electron moving path.

According to J. Yang et al., (Solid state ionics, vol. 152-153, p 125), when SiOx (x=0.8, 1.0, and 1.1) is used as an anode material, as the oxygen content is reduced, initial efficiency increases, however, capacity retention per cycle decreases.

According to Japanese Patent Publication No. 2000-243396, a carbon-SiO composite made by compositing SiO and graphite or a carbon precursor (pitch) is used as an anode material. However, it cannot be called a high capacity anode material since it substantially has a charge and discharge capacity of approximately 350 mAh/g.

In Korean Patent Application No. 2004-7016728, composite particles of Si, SiOx, and carbon particles, and particles of these materials, which are coated with a carbon material, are used as anode materials. However, it can be said that the anode materials have not used the characteristics of SiOx to their full potentials compared to the present invention since the anode material is a mixture of SiOx particles.

Therefore, there is a need to develop an anode material having a large capacity and an improved capacity retention, and a lithium battery having an improved cycle efficiency by using the anode material.

SUMMARY OF THE INVENTION

To overcome the above and/or other problems, the present invention provides a composite for anode material having an improved initial efficiency and capacity retention.

The present invention also provides a method of manufacturing the composite for anode material.

The present invention also provides an anode material using the composite for anode material.

The present invention also provides a lithium battery having the anode material.

According to an aspect of the present invention, there is provided a composite for anode material in which Si particles are distributed in silicon oxide particles.

A molar ratio of silicon to oxygen in the silicon oxide particles may be 0.5 to 1.95.

The content of Si particles in the silicon oxide particles may be 5 to 200 parts by weight regarding 100 parts of silicon oxide.

The Si particles may have a diameter of 0.01 to 5 μm.

The composite for anode material may further comprise carbon on external surfaces of the silicon oxide particles.

The composite for anode material may further comprise carbon additionally distributed in the silicon oxide particles.

In the case that carbon is additionally distributed in the silicon oxide particles, the content of Si particles in the silicon oxide particles may be 5 to 200 parts by weight regarding 100 parts of silicon oxide.

In the case that carbon is additionally distributed in the silicon oxide particles, the content of carbon in the silicon oxide particles may be 5 to 200 parts by weight regarding 100 parts of silicon oxide.

In the case that carbon is additionally distributed in the silicon oxide particles, the carbon may be a crystalline state carbon or an amorphous state carbon.

In the case that carbon is additionally distributed in the silicon oxide particles, the Si particles may have a diameter of 0.01 to 5 μm.

In the case that carbon is additionally distributed in the silicon oxide particles, the composite for anode material may further comprise carbon on external surfaces of the silicon oxide particles.

According to an aspect of the present invention, there is provided a method of manufacturing a composite for anode material, comprising: drying a mixture made by mixing fine Si particles; fine Si particles and carbon; or fine Si particles and a carbon or carbon precursor with a silicon oxide precursor; and annealing the dried product.

The silicon oxide precursor may be a compound expressed in formula 1 and obtained by condensation or polymerization of at least one of these compounds.

$SiH_nR_{4-n}$    <Formula 1> where n=1 through 3, and R is a halogen atom, —OH, or a substituted or non-substituted alkoxy group of $C_1$ through $C_{10}$.

The carbon may be at least one selected from the group consisting of graphite, carbon particles, and carbon nanotubes.

The carbon precursor may be pitch or a hydrocarbon group material.

The method may further comprise coating the annealed product with carbon.

The annealing may be performed at a temperature in a range of 500 to 1500° C. for 10 minutes to 10 hours.

The annealing may be performed under a hydrogen atmosphere.

According to an aspect of the present invention, there is provided an anode material that comprises the composite for anode material described above.

The anode material may further comprise carbon or a material that is able to form an alloy with lithium.

The material that is able to form an alloy with lithium may be at least one selected from the group consisting of Si, $SiO_x(0.8<x≤2)$, Sn, $SnO_x(0<x≤2)$, Ge, $GeOx(0<x≤2)$, Pb, $PbOx(0<x≤2)$, Ag, Mg, Zn, $ZnOx(0<x≤1)$, Ga, In, Sb, and Bi.

According to an aspect of the present invention, there is provided a lithium battery comprising: an anode; a cathode; and an electrolyte, wherein the anode comprises a metal current collector and an anode material coated on the metal current collector, and the anode material is the anode material described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
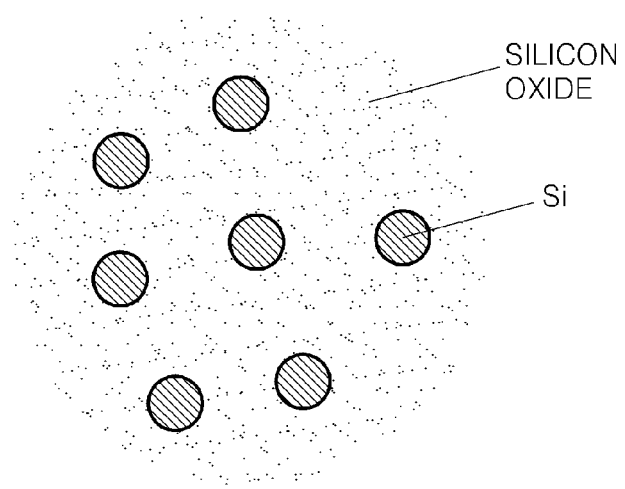
FIGS. 1A and 1B are schematic drawings of an anode material, according to an example of the present invention.

The present invention will now be described more fully with reference to the accompanying drawings in which exemplary embodiments of the invention are shown.

The present invention provides an anode material and a battery that includes the anode material. The anode material is obtained such that, after mixing fine Si particles; fine Si particles and carbon for electrical conductivity; or fine Si particles and carbon precursors, which are used as anode materials, with a silicon oxide precursor, composite particles for anode material are manufactured by annealing the resultant mixture, and then, the composite particles are mixed or coated with carbon; or particles that can form an alloy with lithium.

If Si is only used as the anode material, mechanical failure of the anode occurs due to contraction and expansion of Si during charging and discharging, and if silicon oxide is only used as the anode material, high charge and discharge capacity cannot be obtained. The composite for anode material according to an example of the present invention has large charge and discharge capacity and has improved capacity retention.

According to an example of the present invention, in the composite for an anode material, Si particles or Si particles and carbon exist in a distributed state in silicon oxide particles. However, the distributed state does not denote a simple agglomerated state or a mixture state in which the silicon oxide particles and the Si particles or the Si particles and carbon are present in an agglomerate state by forming a simple inter-particle bonding. The distributed state denotes a state in which the Si particles or the Si particles and carbon are embedded in the silicon oxide particles. This state can also be interpreted that a surface of the Si particles or the Si particles and carbon is coated with silicon oxide.

According to an embodiment of the present invention, a molar ratio of oxygen to silicon in the silicon oxide particles may be in a range of 0.5 to 1.95. If the molar ratio is lower than the above range, the silicon oxide particles have characteristics similar to the Si particles, and thus, the Si particles have reduced resistance to contraction and expansion. If the molar ratio is greater than the above range, the silicon oxide particles have characteristics similar to $SiO_2$ which is a non-conducting substance, and thus, electrical and ionic conductivities of the silicon oxide particles are rapidly reduced, which interrupts a reaction between the Si particles with Li.

According to an embodiment of the present invention, in the case that the Si particles are only distributed in the silicon oxide particles, Si can be present in an amount of 5 to 200 parts by weight regarding 100 parts by weight of silicon oxide. If Si content exceeds the above range, silicon oxide can hardly prevent the silicon oxide particles from degradation caused by contraction and expansion of Si during charging and discharging.

According to an embodiment of the present invention, the composite for anode material can further include crystalline carbon or amorphous carbon in a dispersed state. In this case, the Si particles in the silicon oxide particles may have a diameter in a range of 0.01 to 5 μm. If the diameter of the Si particles is smaller than the above range, when a surface oxidation reaction of the Si particles occurs in the atmosphere, an amount of $SiO_2$ at the surfaces of the Si particles is increased relatively with respect to Si core materials, and thus, the fraction of the active material is reduced, and also, it is difficult to distinguish the Si particles from Si particles generated during annealing silicon oxide of a SiOx group. If the diameter of the Si particles is greater than the above range, the contraction and expansion of the Si particles is increased excessively, and thus, silicon oxide can hardly resist to the contraction and expansion. Meanwhile, Si can be present in a range of 5 to 200 parts by weight regarding 100 parts by weight of the silicon oxide, and carbon can also be present in a range of 5 to 200 parts by weight regarding 100 parts by weight of silicon oxide. The above content range is suitable for burying the Si particles and carbon in silicon oxide and in simultaneously considering the electrical conductivity of the composite for anode material.

According to an embodiment of the present invention, both crystalline carbon and amorphous carbon, for example, graphite, carbon particles, or carbon nano-tubes can be dispersed in the composite for anode material. Carbon such as graphite, carbon particles, or carbon nano-tubes can be used directly, and it is also possible to convert a carbon precursor such as pitch or a hydrocarbon group material into carbon by annealing the precursor, wherein the converted carbon can be dispersed in the composite for anode material.

Figure 1B:
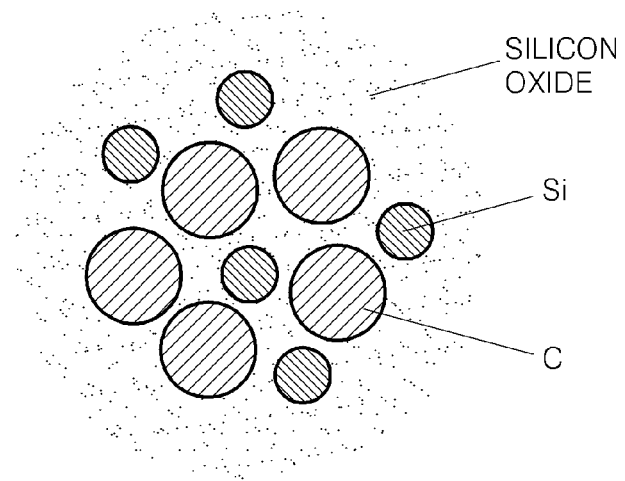

According to an embodiment of the present invention, the silicon oxide in which Si or Si and carbon is/are dispersed is an annealed gel of hydrogen silsesquioxane (HSQ) solution under a hydrogen atmosphere. FIGS. 1A and 1B are schematic diagrams of a composite for anode material, according to an embodiment of the present invention. Referring to FIGS. 1A and 1B, the oxygen bonding in silicon oxide particles performs as a combining agent in contraction and expansion of Si, and uniformly mixed carbon particles perform as a good conductive path, and thus, the composite for anode material has high efficiency and capacity. Such composite particle for anode material may have a diameter of 0.1 to 50 μm, and an electrode can be readily formed in this range of diameter.

Also, the composite for anode material according to an embodiment of the present invention can further include carbon on surfaces of the composite particles by additionally coating the carbon in a state in which Si or Si and carbon is/are buried in the composite for anode material, and thus, can improve electrical conductivity between composite particles for anode material.

A method of manufacturing a composite for anode material according to an embodiment of the present invention will now be described.

The method of manufacturing a composite for anode material includes, after mixing fine Si particles; fine Si particles and carbon; or fine Si particles and a carbon or carbon precursor with a silicon oxide precursor, drying the mixed materials and annealing the dried resultant product.

In the above processes, the silicon oxide precursor can be obtained by condensation or polymerization of a compound of the following formula 1 and of at least one of these compounds.

 <Formula 1>

Where n is 1 through 3, and R can be a halogen atom, —OH, or a substituted or non-substituted alkoxy group of $C_1$ through $C_{10}$.

Non-limited examples of the compound of formula 1 are triethoxy silane, trimethoxy silane, and trichloro silane. Meanwhile, a solvent can be used in manufacturing the composite for anode material, according to an embodiment of the present invention. When a solvent is used, the solvent may be an alcohol solvent such as ethanol, however, not limited thereto. Also, the silicon oxide precursor can be a HSQ compound (for example, FOx of Dow Corning Co.) that can be commercially obtained.

In the process of manufacturing the composite for anode material, carbon can be graphite, carbon particles, and carbon nanotubes, and the carbon precursor can be any material, for example, pitch or a hydrocarbon material that can generate carbon by annealing. The hydrocarbon material can be, for example, a furfuryl alcohol or a phenol resin.

After mixing fine Si particles; fine Si particles and carbon; or fine Si particles and a carbon precursor with the manufactured silicon oxide precursor, the resultant product can be stirred while heated to an appropriate temperature so as to gelate the resultant product, and afterwards, the gel can be dried.

In the above manufacturing process, the silicon oxide precursor that has gelated and dried is converted to silicon oxide through an annealing, and the carbon precursor is converted to carbon. The annealing can be performed at a temperature in a range of 500 to 1500° C. for 10 minutes to 10 hours. If the annealing is performed beyond the above conditions, a sufficient conversion of the silicon oxide precursor and the carbon precursor to silicon oxide and carbon may not be achieved. Also, the annealing may be performed under a non-oxidation gas atmosphere such as hydrogen, nitrogen, or argon atmosphere, and preferably may be performed under a hydrogen atmosphere.

The composite for anode material that has been annealed at the above conditions can be used as the anode material as it is. However, in order to further increase electrical conductivity, a carbon coating can be additionally performed. The carbon coating can be achieved such that, after dispersing the carbon precursor in a solvent, for example, tetrahydrofuran (THF) or alcohol, the resultant product is added to the composite for anode material, and then, dried and annealed.

The composite for anode material described above can be used as the anode material as it is. However, after mixing the above composite for anode material with carbon; and/or a material that can form an alloy with lithium, the resultant product can be used as the anode material. The material that can form an alloy with lithium can be one selected from the group consisting of Si, $SiO_x(0.8<x<2)$, Sn, $SnO_x(0<x≤2)$, Ge, $GeOx(0<x≤2)$, Pb, $PbOx(0<x≤2)$, Ag, Mg, Zn, $ZnOx(0<x≤1)$, Ga, In, Sb, and Bi.

The anode material manufactured according to the method described above can be used in a lithium battery, and thus, a method of manufacturing a lithium battery according to an embodiment of the present invention will now be described.

First, a composition for cathode is prepared by mixing a cathode material, a conducting agent, a binder, and a solvent. After preparing a cathode by directly coating and drying the composition for cathode on an aluminium current collector, the composition for cathode is casted on a separate supporter. Afterwards, a film obtained by being separated from the supporter is laminated on the aluminium current collector, and thus, a cathode is manufactured.

The cathode material can be a lithium containing metal oxide, and can be any material that is conventionally used in the art, and can be, for example, $LiCoO_2$, $LiMn_xO_{2x}$, $LiNi_x$-$1Mn_xO_{2x}$(x=1, 2), or $LiNi_{1-x-y}Co_xMn_yO_2$($0 \leq x \leq 0.5$, $0 \leq y \leq 0.5$).

The conducting agent can be carbon black, and the binder can be vinylidene fluoride/hexafluoropropylene copolymer, polyvinylidene fluoride, polyacrylonitrile, polymethylmetacrylate, polytetrafluoroethylene and its mixture, or styrene butadiene rubber-based polymer. The solvent can be N-methylpyrrolidone, acetone, or water. At this point, the contents of the cathode material, the conducting agent, the binder, and the solvent are conventionally used levels in the lithium battery.

As the same method of manufacturing the cathode described above, a composition for anode is manufactured by mixing an anode material, a conducting agent, a binder, and a solvent. The composition for anode is directly coated on a copper current collector or casted on a separate supporter, and a film of the anode material is exfoliated from the supporter. Thus, an anode is obtained by laminating the film of the anode material on the copper current collector. At this point, the contents of the anode active material, the conducting agent, the binder, and the solvent are conventionally used levels in the lithium battery.

The anode material according to an embodiment of the present invention can be the anode material described above. In the composition for anode material, the conducting agent, the binder, and the solvent can be the same materials used for manufacturing the cathode. If necessary, pores can be formed in the anode and the cathode by adding a plasticizer to the composition for anode material and the composition for anode material.

A separator of various types that are conventionally used in lithium batteries may be used. In particular, the separator may have a low resistance to the movement of ions of electrolyte and have a high absorption capability of electrolyte solution. For example, the separator can be one selected from the group consisting of glass fiber, polyester, polyethylene, polypropylene, polytetrafluoroethylene (PTFE), and a combination of these materials, and may be a non-woven fabric type or a woven fabric type. More specifically, in the case of a lithium ion battery, a separator formed of a material such as polyethylene or polypropylene that can be wound is used, and, in the case of a lithium ion polymer battery, a separator that has a high absorption capability of an organic electrolyte is used. Such separators can be formed in the following method.

That is, after preparing a separator composition of a polymer resin, a filler, and a solvent, the separator can be formed by forming a separator film on an electrode by directly coating and drying the separator composite on the electrode. Or after casting and drying the separator composition on a supporter, then, the separator film is exfoliated from the supporter, and then, the separator can be formed by laminating the separator film on the electrode.

The polymer resin is not particularly limited, and can be of any material that is used in a binder of an electrode plate. The polymer resin can be, for example, vinylidene fluoride/hexafluoropropylene copolymer, polyvinylidenefluoride, polyacrylonitrile, or polymethylmetacrylate and their mixture. In particular, the polymer resin may be vinylidene fluoride/hexafluoropropylene copolymer in which the content of hexafluoropropylene is 8 to 25 parts by weight.

A battery precursor is formed by interposing the separator between the anode and the cathode as described above. The battery precursor is placed in a circular battery case or an angled battery case by winding or folding it, and an organic electrolyte is filled in the case. Thus, the manufacture of a lithium ion battery is completed. Also, after the battery precursors are stacked in a bi-cell structure and the bi-cell structure is soaked in an organic electrolyte, when the resultant product is placed in a pouch and sealed, a lithium ion polymer battery is manufactured.

The organic electrolyte includes lithium salts and an organic solvent made by mixing a high dielectric solvent and a low boiling point solvent, and if necessary, can further include various additives such as an overcharge preventive agent.

The high dielectric solvent used in the organic electrolyte can be of any type of solvent that is conventionally used in the art, for example, a ring type carbonate such as ethylene carbonate, propylene carbonate, and butylene carbonate, or gamma-butyrolactone.

The low boiling point solvent is not particularly limited and can be of any type of solvent that is conventionally used in the art, for example, a chain type carbonate such as dimethyl carbonate, ethylmethyl carbonate, diethyl carbonate, and dipropyl carbonate, dimethoxyethane, diethoxyethane, or a fatty acid ester derivative.

At least one hydrogen atom present in the high dielectric solvent and the low boiling point solvent can be substituted by a halogen atom, and the halogen atom may be a fluoride atom.

The mixing ratio of the high dielectric solvent and the low boiling point solvent may be 1:1 to 1:9 by volume. If the mixing ratio is beyond the above range, it is undesirable in view of discharge capacity and charge/discharge lifespan.

The lithium salts used in the organic electrolyte can be of any type that is conventionally used in lithium batteries, and may be at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

The concentration of the lithium salts in the organic electrolyte may be 0.5 to 2M. If the concentration of the lithium salts is less than 0.5M, the electrical conductivity of the electrolyte is reduced, and thus, the performance of the electrolyte is reduced. If the concentration of the lithium salts exceeds 2M, viscosity of the electrolyte is increased, and thus, the mobility of lithium ions is reduced.

The present invention will be described more in detail through the following Examples of the present invention and comparative examples. However, the Examples of the present invention are examples and they do not limit the scope of the present invention.

Example 1

Manufacturing HSQ (Hydrogen Silsesquioxan) Solution

After adding 1.5 g of triethoxy silane (product of Aldrich Co.) in 10 ml of ethanol, the solution was stirred for 30 minutes. 0.6 g of 0.5M HCl solution was added to the solution, and stirred for 6 hours, and thus, a precursor solution was prepared.

Example 2

Manufacturing a Composite of Silicon Oxide Particles 1 that Include Si

The precursor solution manufactured in Example 1 and Si nano particles having a diameter of 30 to 50 nm (product of Nanostructured & Amorphous Materials, Inc. (USA)) were mixed with a mixing ratio of silicon oxide to Si of 1:0.1 by weight. Afterwards, the mixture was gelated by stirring it at a temperature of 60° C. and was dried in an oven at a temperature of 90° C. The gel was annealed at a temperature of 1000° C. for 1 hour under a hydrogen atmosphere, and then, a composite of silicon oxide particles 1 was manufactured by grinding the annealed gel.

Example 3

Manufacturing Composite of Silicon Oxide Particles 2 that Includes Si

A composite of silicon oxide particles 2 that include Si was manufactured using the same method as in the Example 1 except that the mixing ratio of silicon oxide to Si was 1:0.2 by weight.

Example 4

Manufacturing a Composite of Silicon Oxide Particles 3 that Include Si and Carbon Particles The precursor solution manufactured in Example 1, Si nano particles having a diameter of 30 to 50 nm (product of Nanostructured & Amorphous Materials, Inc. (USA)), and graphite particles (SFG6, product of TimCal Co.) were mixed in a mixing ratio of silicon oxide:Si:carbon=1:0.1:0.2 by weight. The mixture was gelated by stirring it at a temperature of 60° C., and was dried in an oven at a temperature of 90° C. Afterwards, the gel was annealed at a temperature of 1000° C. for 1 hour under a hydrogen atmosphere, and then, the composite of silicon oxide particles 1 that include Si and carbon particles was manufactured by grinding the gel.

Example 5

Manufacturing a Composite of Silicon Oxide Particles 4 that Include Si and Carbon Particles A composite of silicon oxide particles 2 that include Si and carbon particles was manufactured using the same method as in the Example 4 except that the mixing ratio of silicon oxide:Si:carbon is 0.5:0.1:0.2 by weight.

Example 6

0.045 g of the material manufactured in Example 2, 0.045 g of graphite (SFG6, product of TimCal Co.) were mixed in 0.2 g of N-methylpyrrolidone (NMP) solution of 5 wt % polyvinylidene fluoride (PVDF) (KF 1100, product of Kureha, Japan), which is a binder. Then, an electrode was manufactured by coating the mixture on a Cu foil.

Example 7

An electrode was manufactured using the same method as in Example 6 except that 0.045 g of the material manufactured in Example 3 and 0.045 g of graphite (SFG6, product of TimCal Co.) were mixed.

Example 8

An electrode was manufactured using the same method as in Example 6 except that 0.053 g of the material manufactured in Example 4 and 0.037 g of graphite (SFG6, product of TimCal Co.) were mixed.

Example 9

An electrode was manufactured using the same method as in Example 6 except that 0.0435 g of the material manufactured in Example 5 and 0.0465 g of graphite (SFG6, product of TimCal Co.) were mixed.

Example 10

0.2 g of the material manufactured in Example 5 was mixed with a solution prepared by mixing 0.04 g of pitch in 20 g of THF, and the mixture was dried while stirring it in a water bath which is maintained at a temperature of 60° C. The dried product was annealed at a temperature of 900° C. for 1 hour under an argon atmosphere, and the annealed product was ground to manufacture carbon coating particles. Then, an electrode was manufactured using the same method as in Example 6 except that 0.0435 g of the carbon coating particles and 0.0465 g of graphite (SFG6, product of TimCal Co.) were mixed.

Example 11

An electrode was manufactured using the same method as in Example 6 except that 0.025 g of the material manufactured in Example 5, 0.012 g of Si particles having a diameter of 30 to 50 nm (available from Nanostructured & Amorphous Materials, Inc. (USA)), and 0.053 g of graphite (SFG6, product of TimCal Co.) were mixed.

Comparative Example 1

An electrode was manufactured using the same method as in Example 6 except that Si particles having an average particle diameter of 1 μm were manufactured by ball milling Si particles having a particle diameter of approximately 43 μm, and that 0.03 g of the Si particles having an average particle diameter of 1 μm and 0.06 g of graphite (SFG6, product of TimCal Co.) were mixed.

Comparative Example 2

The precursor solution manufactured in Example 1 was gelated while stirring in a bath which is maintained at a temperature of 60° C., and the gel was dried in an oven at a temperature of 90° C. The gel was annealed at a temperature of 1000° C. for 1 hour under a hydrogen atmosphere, and silicon oxide particles were manufactured by grinding the gel. Afterwards, an active material mixture was manufactured by mixing 0.045 g of the silicon oxide particles with 0.045 g of graphite (SFG6, product of TimCal Co.). The active material mixture was mixed in 0.2 g of N-methylpyrrolidone (NMP) solution of 5 wt % polyvinylidene fluoride (PVDF) (KF 1100, product of Kureha, Japan), which is a binder. Then, an electrode was manufactured by coating the mixture on a Cu foil.

<Experiment 1: Cycle Characteristic Test>

After manufacturing a coin cell having a 2016-shape using the electrodes obtained through the Examples 6 through 11 and the Comparative examples 1 and 2 as anodes and a Li metal as an cathode, charge and discharge were performed between 1.5V and 0V.

Figure 4:
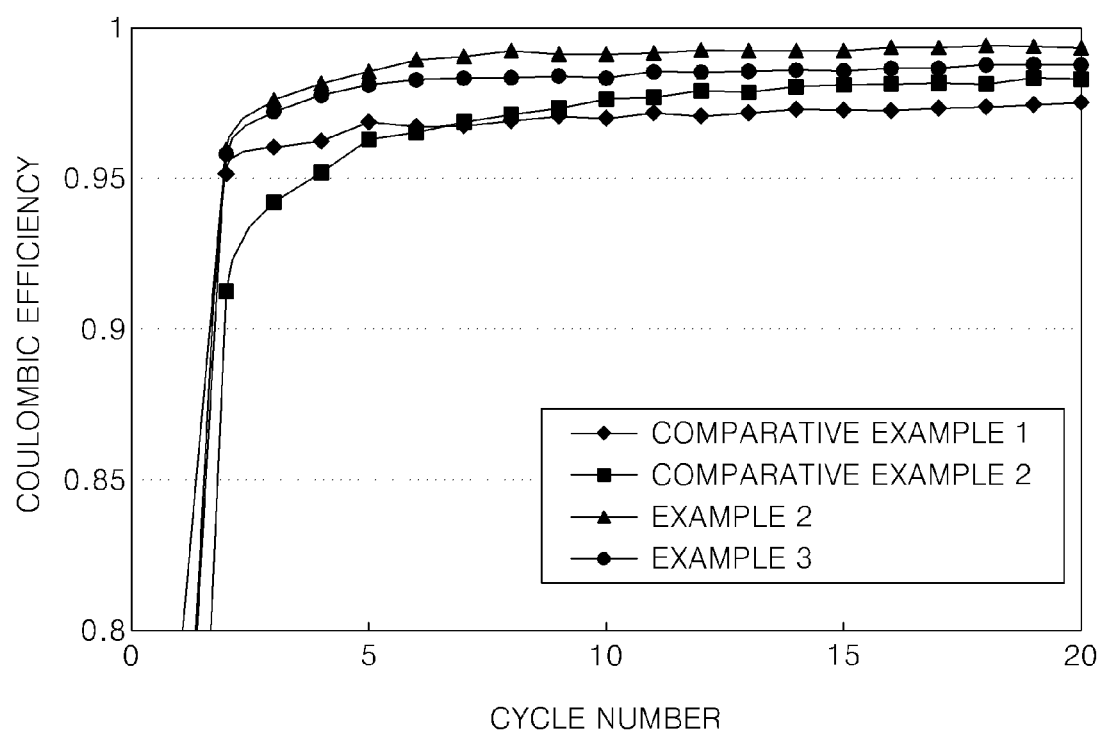
FIG. 4 is a graph illustrating initial cycle dependency of coulombic efficiency of an anode material obtained by example 8 and 9 and comparative examples 1 and 2 of the present invention.

A mixture solution made by mixing ethylene carbonate (EC) in which 1.3M $LiPF_6$ is dissolved, diethylene carbonate (DEC), and fluoro ethylene carbonate with a mixing ratio of 2:6:2 by volume, was used as an electrolyte. A constant current charge was performed with respect to the Li electrode of the coin cell until a voltage reached 0.001V using a current of 100 mA per 1 g of active material, and next, a constant voltage charge was performed until the current was reduced to 10 mA per 1 g of active material while maintaining 0.001V. Cells to which charge was applied to were paused for approximately 10 minutes, and afterwards, a constant current discharge was performed to the cells until the voltage reaches 1.5V using a current of 100 mA per 1 g active material and the results are summarized in Table 1 and are illustrated in FIG. 4.

TABLE 1

| | Initial discharge capacity (mAh/g) | Initial efficiency (%) | Capacity retention (%) @ 50 cycle |
|---|---|---|---|
| Example 6 | 711 | 59 | 49 |
| Example 7 | 831 | 64 | 49 |
| Example 8 | 806 | 65 | 89 |
| Example 9 | 691 | 69 | 95 |
| Example 10 | 579 | 70 | 88 |
| Example 11 | 898 | 76 | 89 |
| Comparative example 1 | 963 | 73 | 25 |
| Comparative example 2 | 460 | 42 | 88 |

Referring to Table 1, in the cases when the Si particle composite (Examples 6 and 7) is used and when Si and graphite (Examples 8 and 9) are used as an active material for a lithium battery, the initial capacity and the initial efficiency are rapidly increased compared to the case when only the silicon oxide particles are used (Comparative example 2). Also, the above two cases have capacity retention higher than that of when only the Si particles are used (Comparative example 1), although they have initial efficiencies lower than that of when only the Si particles are used (Comparative example 1).

The active material used in Example 10 is formed by coating carbon on the active material used in Example 9. Example 10 illustrates increased initial efficiency, although it also illustrates reduced initial charge capacity and capacity retention. In Example 11, the active material is formed by mixing silicon nano particles. Example 11 illustrates a slightly low capacity retention, however, it also illustrates greatly improved initial charge capacity and initial efficiency.

FIG. 4 is a graph illustrating initial coulombic efficiency of an anode material obtained in Examples 8 and 9 and comparative examples 1 and 2. Referring to FIG. 4, the active materials according to the present invention have coulombic efficiencies that are increased and stabilized in a short time when compared to the comparative examples 1 and 2.

Figure 2A:
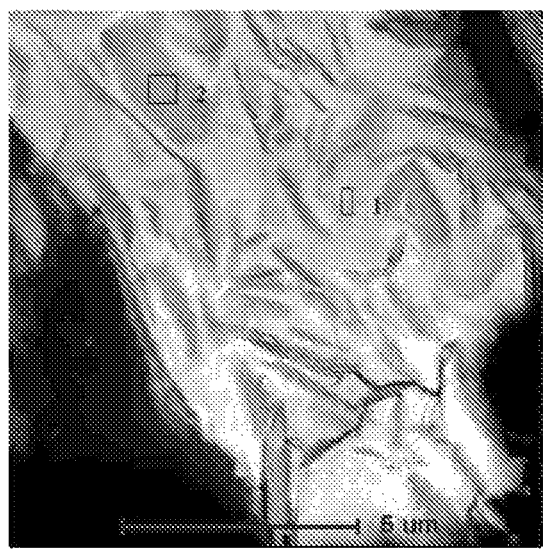
FIG. 2A is a scanning electron microscope (SEM) image of a portion of a particle of an anode material obtained by an example 5 of the present invention.
Figure 2B:
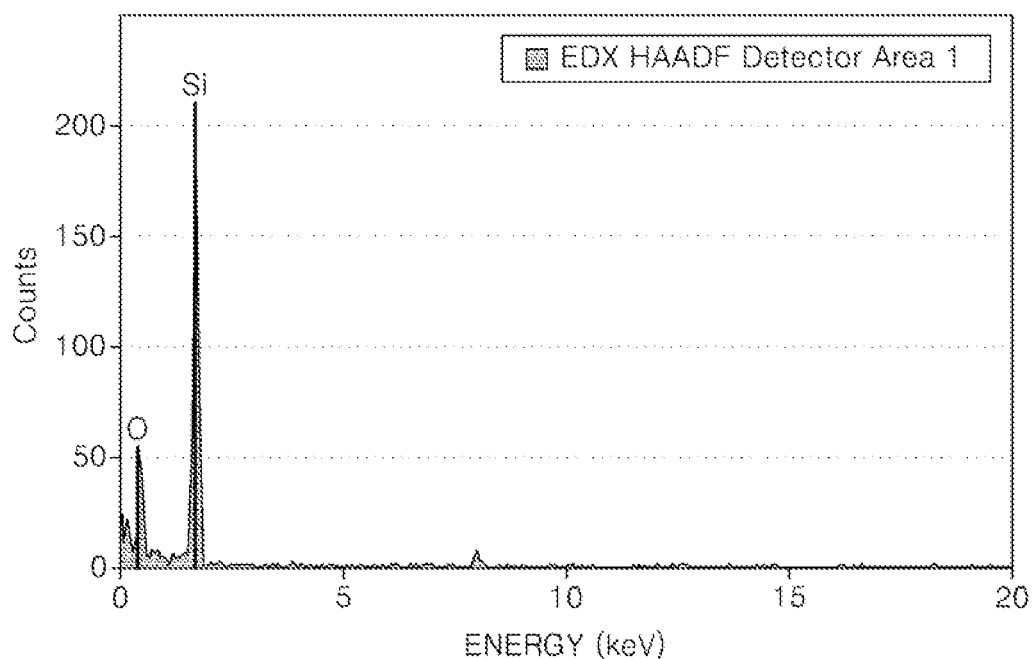
FIGS. 2B and 2C are graphs illustrating an Energy Dispersive X-Ray (EDX) quantity analysis of a portion of a particle of an anode material obtained by the example 5 of the present invention.
Figure 2C:
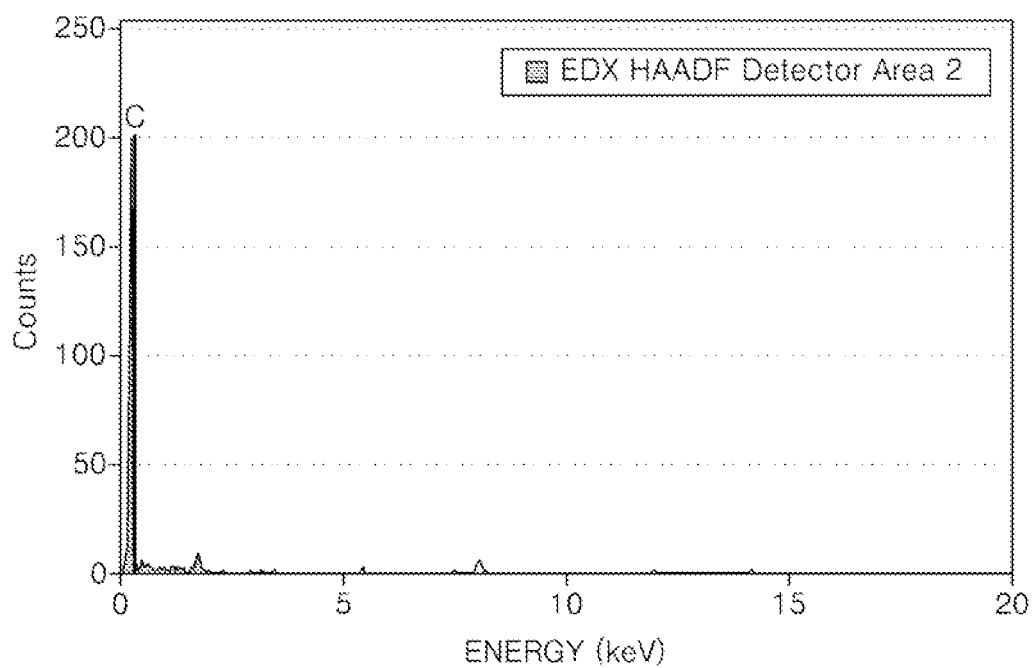
Figure 3A:
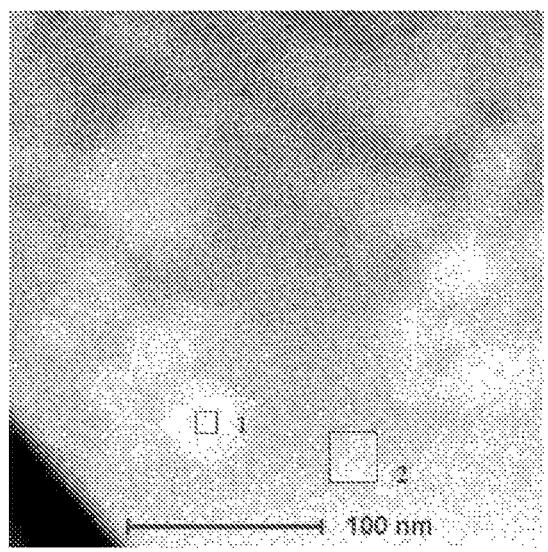
FIG. 3A is a magnified transmission electron microscope (TEM) image of a near Si of a particle of an anode material obtained by the example 5 of the present invention.
Figure 3B:
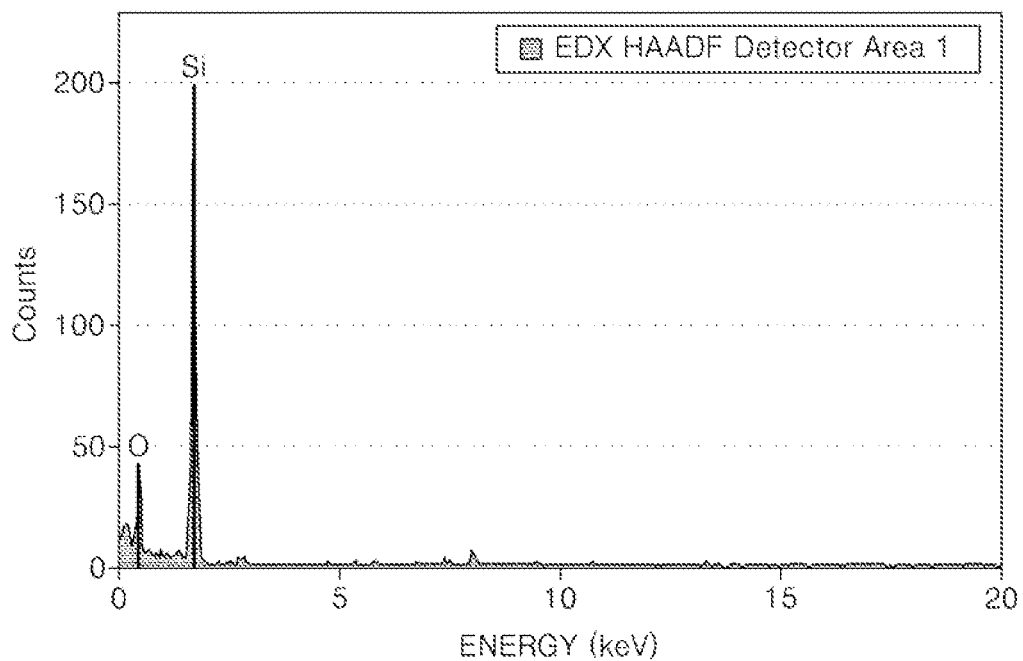
FIGS. 3B and 3C are graphs illustrating an EDX quantity analysis of a near Si of a particle of an anode material obtained by the example 5 of the present invention.
Figure 3C:
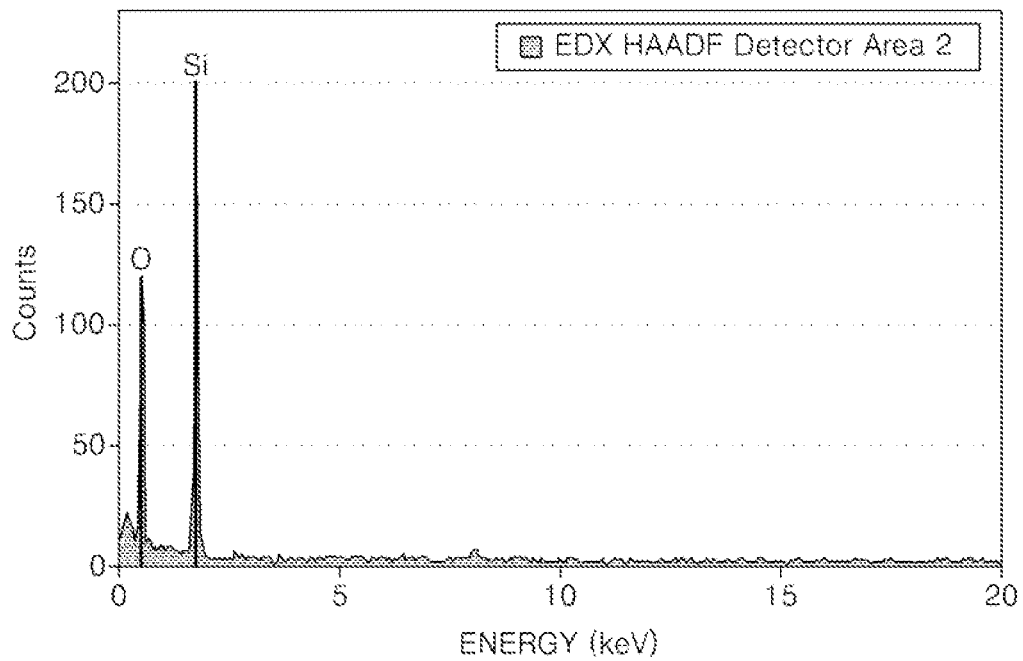

FIG. 2A is a scanning electron microscope (SEM) image of a portion of a particle of an anode material obtained by an Example 5 of the present invention, and FIGS. 2B and 2C are graphs showing Energy Dispersive X-Ray (EDX) quantity analysis of a portion of a particle of an anode material obtained by the Example 5 of the present invention. FIG. 3A is a magnified transmission electron microscope (TEM) image of near Si of a particle of an anode material obtained by the Example 5 of the present invention, and FIGS. 3B and 3C are graphs showing EDX quantity analysis of near Si of a particle of an anode material obtained by the Example 5 of the present invention. The above drawings are obtained such that, after manufacturing measuring specimens of the anode material obtained by Example 5 using an ion milling method, measurements and EDX quantity analysis are performed using a tecnai F20 (200 keV FETEM). In FIGS. 2A through 2C, carbon and Si are uniformly distributed in a silicon oxide matrix in the particles, which is similar to FIG. 1B. Also, in FIG. 3A, which is a magnified view near Si, a molar ratio of Si to oxygen in the silicon oxide that surrounds the Si particle is approximately 1.4.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite for an anode material comprising Si particles and carbon coated with silicon oxide particles, and carbon on external surfaces of the silicon oxide particles, wherein a content of Si particles in the silicon oxide particles is 10 to 20 parts by weight based on 100 parts by weight of silicon oxide, and a content of carbon in the silicon oxide particles is 20 to 40 parts by weight based on 100 parts by weight of silicon oxide.

2. The composite of claim 1, wherein a molar ratio of oxygen to silicon in the silicon oxide particles is 0.5 to 1.95.

3. The composite of claim 1, wherein the Si particles have an average particle diameter of 0.01 to 5 μm.

4. The composite of claim 1, wherein the carbon is a crystalline state carbon or an amorphous state carbon.

5. An anode material comprising the composite according to claim 1.

6. The anode material of claim 5, wherein a molar ratio of oxygen to silicon in the silicon oxide particles is 0.5 to 1.95.

7. The anode material of claim 5, wherein the anode material further comprises carbon.

8. The anode material of claim 5, wherein the anode material further comprises a material that is able to form an alloy with lithium.

9. The anode material of claim 8, wherein the material that is able to form an alloy with lithium is at least one selected from the group consisting of Si, $SiO_x(0.8<x\leq2)$, Sn, $SnO_x(0<x\leq2)$, Ge, $GeO_x(0<x\leq2)$, Pb, $PbO_x(0<x\leq2)$, Ag, Mg, Zn, $ZnO_x(0<x\leq1)$, Ga, In, Sb, and Bi.

10. A lithium battery comprising:
   an anode comprising a metal current collector and the anode material of claim 5 coated on the metal current collector;
   a cathode; and
   an electrolyte.

11. A lithium battery of claim 10, wherein a molar ratio of oxygen to silicon in the silicon oxide particles is 0.5 to 1.95.

12. The composite of claim 1, where a mixing ratio of silicon oxide:Si:carbon is 1:0.1:0.2 or 0.5:0.1:0.2 by weight.

* * * * *